United States Patent
Shin et al.

(10) Patent No.: US 9,436,267 B2
(45) Date of Patent: Sep. 6, 2016

(54) DATA STORAGE DEVICE

(71) Applicant: SK hynix Inc., Gyeonggi-do (KR)

(72) Inventors: Dong Jae Shin, Gyeonggi-do (KR); Soo Nyun Kim, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 220 days.

(21) Appl. No.: 14/143,889

(22) Filed: Dec. 30, 2013

(65) Prior Publication Data
US 2015/0113305 A1 Apr. 23, 2015

(30) Foreign Application Priority Data
Oct. 17, 2013 (KR) .................. 10-2013-0123967

(51) Int. Cl.
*G06F 1/32* (2006.01)
*G06F 3/06* (2006.01)

(52) U.S. Cl.
CPC .......... *G06F 1/3275* (2013.01); *G06F 1/3293* (2013.01); *G06F 3/0625* (2013.01); *G06F 1/3237* (2013.01); *G06F 1/3287* (2013.01); *Y02B 60/121* (2013.01); *Y02B 60/1228* (2013.01); *Y02B 60/1282* (2013.01)

(58) Field of Classification Search
CPC ...................................................... G06F 1/3293
See application file for complete search history.

(56) References Cited

U.S. PATENT DOCUMENTS

| | | | | |
|---|---|---|---|---|
| 2008/0263324 A1* | 10/2008 | Sutardja | ............... | G06F 1/3203 712/43 |
| 2011/0213994 A1* | 9/2011 | Thereska | ............... | G06F 1/3221 713/320 |
| 2014/0089703 A1* | 3/2014 | Starr | .................... | G06F 1/3293 713/323 |
| 2014/0095646 A1* | 4/2014 | Chan | ................ | G06F 17/30085 709/213 |

FOREIGN PATENT DOCUMENTS

KR 1020100124082 11/2010

* cited by examiner

*Primary Examiner* — Kim Huynh
*Assistant Examiner* — Eric Chang
(74) *Attorney, Agent, or Firm* — IP & T Group LLP (57) ABSTRACT

A data storage device includes a nonvolatile memory device; and a controller suitable for controlling an operation of the nonvolatile memory device based on a request from a host device, wherein the controller includes a first core activated in a normal mode and a second core activated in a standby mode.

16 Claims, 8 Drawing Sheets

DATA STORAGE DEVICE

CROSS-REFERENCES TO RELATED APPLICATION

The present application claims priority under 35 U.S.C. §119(a) to Korean application number 10-2013-0123967, filed on Oct. 17, 2013, in the Korean Intellectual Property Office, which is incorporated herein by reference in its entirety.

BACKGROUND

1. Technical Field

Various embodiments of the present invention relate to a data storage device, and more particularly, to a data storage device with a multi-core controller.

2. Related Art

Recently, the paradigm for the computer environment has changed into a ubiquitous computing so that computer systems may be used anytime and anywhere. Thus, the use of portable electronic devices such as mobile phones, digital cameras, and notebook computers has rapidly increased. In general, such portable electronic devices employ a data storage device, which uses a memory device. The data storage device is used to store data to be used in a portable electronic device.

A data storage device using a memory device provides advantages in that, since there is no mechanical driving part, stability and durability are excellent, an information access speed is high and power consumption is small. Data storage devices having such advantages may include a universal serial bus (USB) memory device, a memory card having various interfaces, and a solid-state drive (SSD).

SUMMARY

A data storage device capable of reducing power consumption is described herein.

In an embodiment of the present invention, a data storage device may include a nonvolatile memory device and a controller suitable for controlling an operation of the nonvolatile memory device base on a request from a host device, wherein the controller includes a first core activated in a normal triode and a second core activated in a standby mode.

In an embodiment of the present invention, a data storage device may include a nonvolatile memory device, and a controller suitable for controlling the nonvolatile memory device based on a request from an external device, wherein the controller includes a control unit including a first core and a second core, and a power supply suitable for providing a first operation power to the first core in a normal mode, and providing a second operation power to the second core in a standby mode.

According to the embodiments of the present invention, the power consumption of a data storage device may be reduced.

BRIEF DESCRIPTION OF THE DRAWINGS

Features, aspects, and embodiments are described in conjunction with the attached drawings, in which.

DETAILED DESCRIPTION

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains may easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention. Throughout the disclosure, reference numerals correspond directly to the like numbered parts in the various figures and embodiments of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device according to the present invention will be described below with reference to the accompanying drawings through exemplary embodiments.

In the following description, a block that functions as a processor unit is referred to as a core. Further, a multi-core controller denotes a controller that includes parallel-coupled multiple cores therein.

Figure 1:
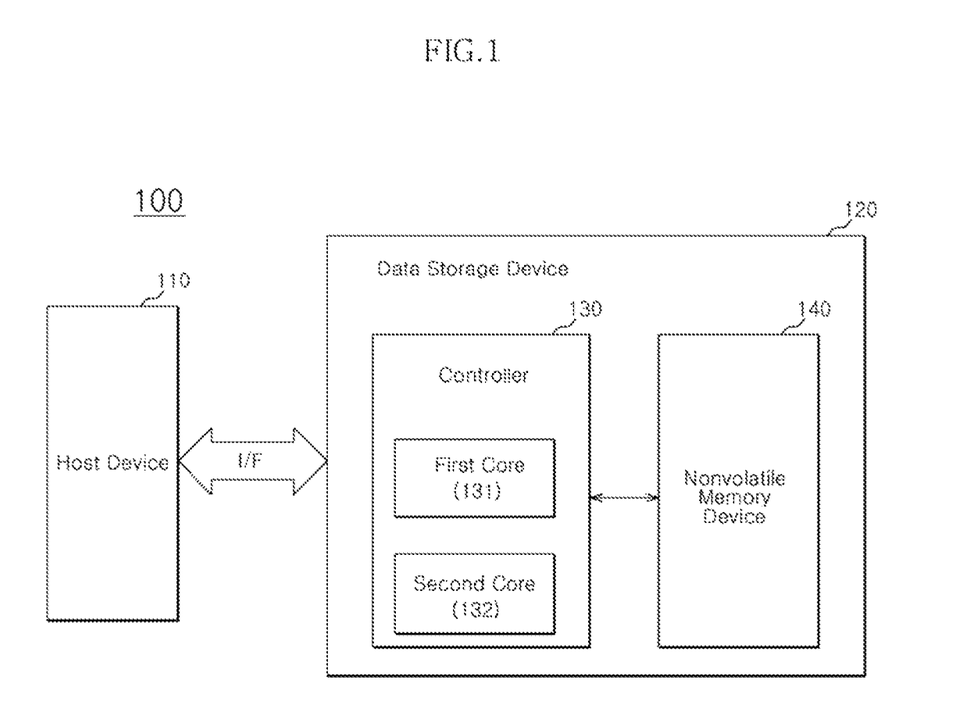
FIG. 1 is a block diagram illustrating a data processing system including a data storage device in accordance with an embodiment of the present invention.

FIG. 1 is a block diagram illustrating a data processing system 100 including a data storage device in accordance with an embodiment of the present invention.

Referring to FIG. 1, the data processing system 100 may include a host device 110 and a data storage device 120.

The host device 110 may include a portable electronic device such as a mobile phone, an MP3 player, a digital camera and a laptop computer, or an electronic device such as a desktop computer, a game player, a TV, a beam projector and a car entertainment system.

The data storage device 120 may operate in response to a request from the host device 110. The data storage device 120 may store data to be accessed by the host device 110. The data storage device 120 may also be referred to as a memory system.

The data storage device 120 may be any one of various kinds of storage devices according to the protocol of an interface (I/F), which is coupled with the host device 110. For example, the data storage device 120 may be configured as any one of various kinds of storage devices such as a solid-state drive, a multimedia card (e.g., an MMC, an eMMC, an RS-MMC or micro-MMC), a secure digital card (e.g., an SD, a mini-SD or a micro-SD), a universal serial bus (USB) storage device, a universal flash storage (UFS) device, a personal computer memory card international association (PCMCIA) card, a compact flash (CF) card, a smart media card, a memory stick, and so forth.

The data storage device 120 may include a controller 130 and a nonvolatile memory device 140.

The controller 130 may control the general operations of the data storage device 120. The controller 130 may drive a firmware or a software, which is loaded on a working memory (not shown), in order to control the general operations of the data storage device 120. The controller 130 may control the nonvolatile memory device 140 in response to a request from the host device 110. For example, the controller 130 may provide the data read from the nonvolatile memory device 140 to the host device 110. For another example, the controller 130 may store the data provided from the host device 110 in the nonvolatile memory device 140. For these operations, the controller 130 may control the read, program (or write) and erase operations of the nonvolatile memory device 140.

The controller 130 may include a first core 131 and a second core 132. While the controller 130 including two cores 131 and 132 is exemplified for the sake of simplification of explanation, two or more cores may be included in the controller 130 as the occasion demands. Also, while the controller 130 including the first core 131 and the second core 132 is exemplified, the first core 131 may be configured as a first controller, for example, a main controller, and the second core 132 may be configured as a second controller, for example, a sub controller, which is functionally or physically separate from the first controller.

The size of a core, that is, the number of logic gates, which constitute the core, may be proportional to the performance and the power consumption of the core. For instance, the number of logic gates constituting a core with high performance may be larger than that of logic gates constituting a core with low performance. Further, the power consumption of the core with high performance may be larger than that of the core with low performance. According to the embodiment of the present invention, the number of the logic gates included in the first core 131 may be larger than the number of the logic gates included in the second core 132. For this reason, the first core 131 may have performance superior to the second core 132. That is, for the same time period, an amount of jobs to be processed by the first core 131 may be larger than that of jobs to be processed by the second core 132. Moreover, for the same time period, the power consumption of the first core 131 may be larger than that of the second core 132.

The first core 131 and the second core 132 may independently perform their jobs. The first core 131 and the second core 132 may perform a job in cooperation with each other. The first core 131 may take charge of jobs, which are associated with both the host device 110 and the nonvolatile memory device 140 (i.e., host-dependent jobs). The second core 132 may take charge of jobs, which are associated with the nonvolatile memory device 140 (i.e., host-independent jobs).

The first core 131 may operate while the data storage device 120 operates in a normal mode. While the first core 131 operates, the second core 132 may enter a standby state. In this case, power and a clock used for the second core 132 to operate may not be provided to the second core 132. Power and a clock used for the second core 132 to retain the standby state may be provided to the second core 132.

The second core 132 may operate while the data storage device 120 operates in a standby mode (or an idle mode or a power-saving mode). While the second core 132 operates, the first core 131 may enter a standby state. In this case, power and a clock used for the first core 131 to operate may not be provided to the first core 131. Power and a clock used for the first core 131 to retain the standby state may be provided to the first core 131.

While the data storage device 120 operates in the standby mode, since the first core 131 with high performance and high power consumption does not operate and only the second core 132 with low performance and low power consumption operates, the power consumption of the data storage device 120 may be reduced.

The nonvolatile memory device 140 may operate as the storage medium of the data storage device 120. The nonvolatile memory device 140 may include any one of various types of nonvolatile memory devices such as a NAND flash memory device, a NOR flash memory device, a ferroelectric random access memory (FRAM) using ferroelectric capacitors, a magnetic random access memory (MRAM) using a tunneling magneto-resistive (TMR) layer, a phase change random access memory (PRAM) using a chalcogenide alloy, and a resistive random access memory (ReRAM) using a transition metal oxide. Furthermore, the nonvolatile memory device 140 may include a combination of a NAND flash memory device and at least one of the various types of nonvolatile memory devices described above.

Figure 2:
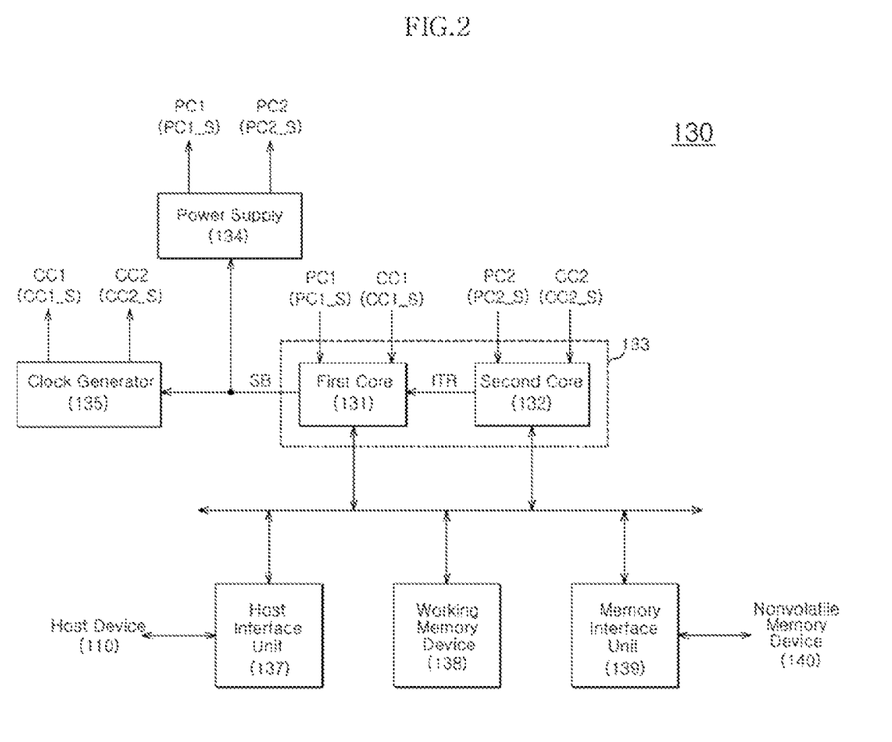
FIG. 2 is a detailed diagram of a controller shown in FIG. 2.

FIG. 2 is a detailed block diagram illustrating the controller 130 shown in FIG. 1.

Referring to FIG. 2, the controller 130 may include a control unit 133, a power supply 134, a clock generator 135, a host interface unit 137, a working memory device 138, and a memory interface unit 139. While not shown, the controller 130 may further include an error correction code (ECC) unit that may detect and correct an error of data to be stored in or read from the nonvolatile memory device 140.

The control unit 133 may include the first core 131 and the second core 132. The first core 131 and the second core 132 may drive a firmware or a software, which is loaded on the working memory device 138. Jobs to be processed by the controller 130 may be processed through code driving of the first core 131 and the second core 132.

The first core 131 may provide an activated standby mode signal SB to the power supply 134 and the clock generator 135 when the data storage device 120 enters the standby mode from the normal mode. The power supply 134 may selectively supply power to the first core 131 and the second core 132 in response to the activated standby mode signal SB. The clock generator 135 may selectively supply clocks to the first core 131 and the second core 132 in response to the activated standby mode signal SB.

The power supply 134 may block the supply of power PC1 to the first core 131 in response to the activated standby mode signal SB. The power supply 134 may supply power PC1_S used for the first core 131 to retain the standby state in response to the activated standby mode signal SB. The power supply 134 may supply power PC2 to the second core 132 in response to the activated standby mode signal SB.

The clock generator 135 may block the supply of a clock CC1 to the first core 131 in response to the activated standby mode signal SB. The clock generator 135 may supply a clock CC1_S used for the first core 131 to retain the standby state in response to the activated standby mode signal SB. The clock generator 135 may supply a dock CC2 to the second core 132 in response to the activated standby mode signal SB.

Through this procedure, while the data storage device 120 operates in the standby mode, the first core 131 may be deactivated, and the second core 132 may be activated. While the data storage device 120 operates in the standby mode, the first core 131 may operate in the standby state, and the second core 132 may perform jobs to be processed in the standby mode.

The second core 132 may provide an interrupt signal ITR to the first core 131 when the data storage device 120 enters the normal mode from the standby mode. The first core 131 may provide the deactivated standby mode signal SB to the power supply 134 and the clock generator 135, in response to the interrupt signal ITR provided from the second core 132.

The power supply 134 may supply the power PC1 to the first core 131 in response to the deactivated standby mode signal SB. The power supply 134 may block the supply of the power PC2 to the second core 132 in response to the deactivated standby mode signal SB. The power supply 134 may supply power PC2_S used for the second core 132 to retain the standby state in response to the deactivated standby mode signal SB.

The clock generator 135 may supply the clock CC1 to the first core 131 in response to the deactivated standby mode signal SB. The clock generator 135 may block the supply of the clock CC2 to the second core 132 in response to the deactivated standby mode signal SB. The clock generator 135 may supply a clock CC2_S used for the second core 132 to retain the standby state in response to the deactivated standby mode signal SB.

Through this procedure, while the data storage device 120 operates in the normal mode, the first core 131 may be activated, and the second core 132 may be deactivated. While the data storage device 120 operates in the normal mode, the first core 131 may perform jobs to be processed in the normal mode, and the second core 132 may operate in the standby state.

The host interface unit 137 may interface the host device 110 and the controller 130. For example, the host interface unit 137 may perform interfacing through one of various interface protocols such as a universal flash storage (UFS) protocol, a universal serial bus (USB) protocol, a multimedia card (MMC) protocol, a secure digital (SD) card protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 139 may interface the controller 130 and the nonvolatile memory device 140. The memory interface unit 139 may provide a command and an address to the nonvolatile memory device 140 under the control of the control unit 133. Furthermore, the memory interface unit 139 may exchange data with the nonvolatile memory device 140.

Figure 3:
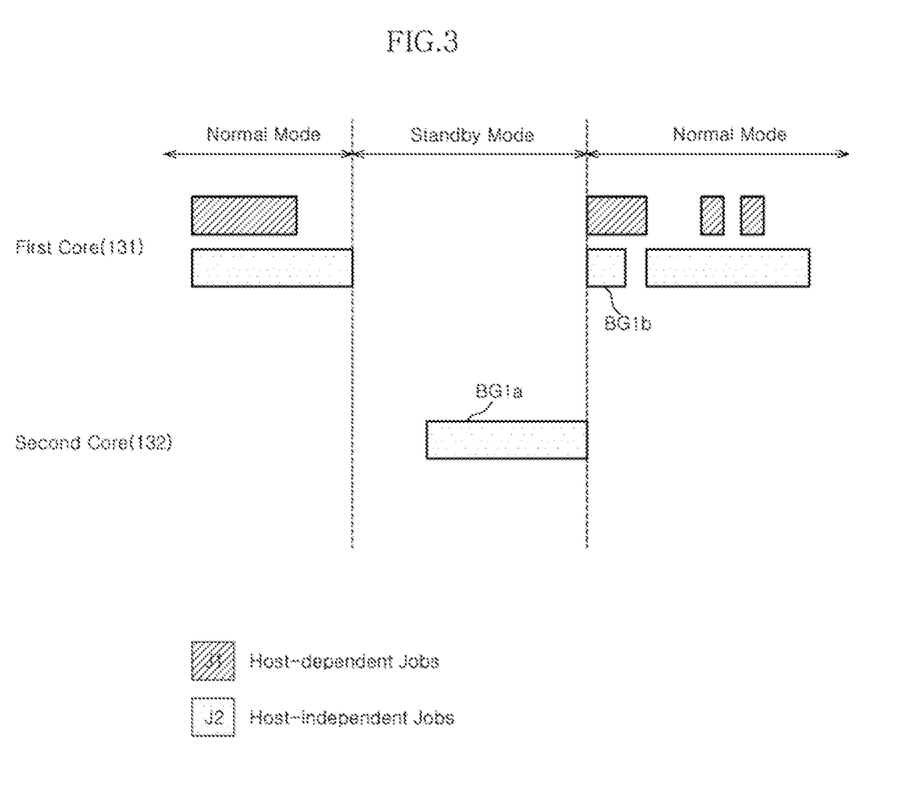
FIG. 3 is a diagram for explaining jobs to be processed by a controller shown in FIG. 1.

FIG. 3 is a diagram for explaining jobs to be processed by the controller 130 shown in FIG. 2.

Hereinbelow, the role allocation of the first core 131 and the second core 132 depending on the operation mode of the data storage device 120 will be described in detail with reference to FIGS. 2 and 3.

Jobs to be processed by the control unit 133 including the first core 131 and the second core 132 may be classified into host-dependent jobs 31 and host-independent jobs 32.

The host-dependent jobs 31 may include jobs associated with the host device 110. For instance, the host-dependent jobs 31 may include jobs associated with input/output of data, such as of outputting data to the host device 110 or being inputted with data from the host device 110. Further, the host-dependent jobs 31 may include a job for interfacing with the host device 110, a synchronizing job for performing a function requested by the host device 110, and a job for setting a function from the host device 110, a job for managing the host device 110, and so forth.

The host-independent jobs 32 may include jobs associated with a job for internally managing the data storage device 120. For instance, the host-independent jobs 32 may include a management job due to the characteristic of the nonvolatile memory device 140. That is, the host-independent jobs 32 may include a job for managing the nonvolatile memory device 140. The host-independent jobs 32 will be described in detail with reference to FIG. 4.

The data storage device 120 may operate in the standby mode, the idle mode or the power-saving mode when there is not a job to be processed, for example, a job requested from the host device 110. For instance, the data storage device 120 may operate in the standby mode when there is not a job to be performed, which is associated with input/output of data, such as of outputting data to the host device 110 or being inputted with data from the host device 110. The data storage device 120 may operate in the normal mode when there is a job to be processed, for example, a job requested from the host device 110. In other words, the data storage device 120 may operate in the normal mode, except when it operates in the standby mode.

The first core 131 may have high performance and high power consumption characteristics. Accordingly, the first core 131 may perform all jobs to be processed by the control unit 133. For example, while the data storage device 120 operates in the normal mode, the first core 131 may perform both the host-dependent jobs 31 and the host-independent jobs 32, which may be raised in the course of performing the host-dependent jobs 31.

The second core 132 may have low performance and low power consumption characteristics. Accordingly, the second core 132 may perform only partial jobs among all the jobs to be processed by the control unit 133. For example, the second core 132 may perform only the host-independent jobs 12 while the data storage device 120 operates in the standby mode.

When there is no job to be processed by the control unit 133, the data storage device 120 enters the standby mode. That is, the data storage device 120 may enter the standby mode only when the first core 131 has completed all jobs. Accordingly, a case where the second core 132 performs an interrupted job, when a job that is being performed by the first core 131 is not completed, does not occur. Conversely, while the second core 132 performs a job, the mode of the data storage device 120 may be changed from the standby mode to the normal mode. In other words, while the second core 132 performs the job for internally managing the data storage device 120, for example, the job for managing the nonvolatile memory device 140, the mode of the data storage device 120 may be changed from the standby mode to the normal mode. Since the first core 131 may perform both the host-dependent jobs J1 and the host-independent jobs J2, a job BG1a, which is not completed by the second core 132 may be continuously performed by the first core 131 (i.e., a job BG1b).

Figure 4:
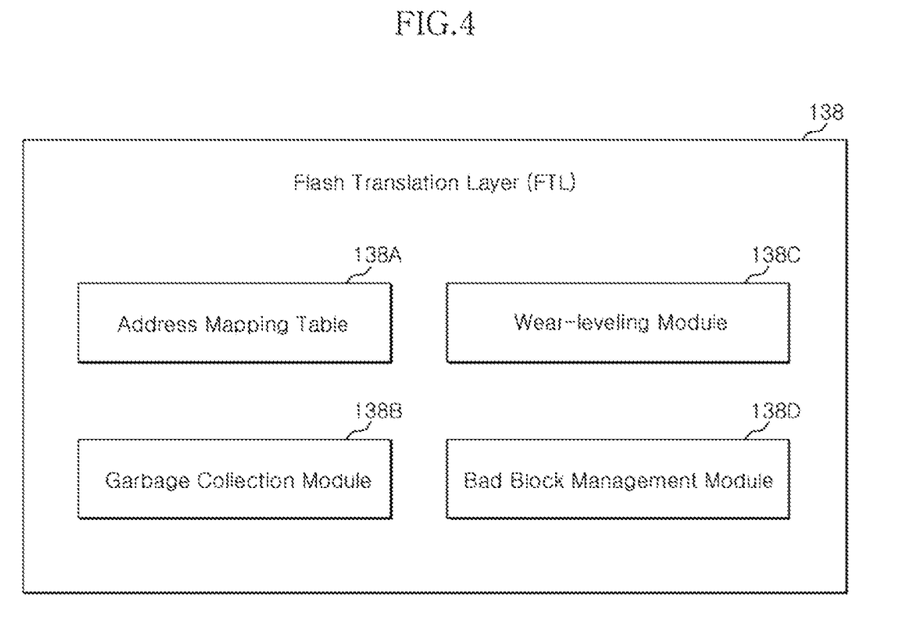
FIG. 4 is a diagram for explaining host-independent jobs shown in FIG. 3.

FIG. 4 is a diagram for explaining host-independent jobs shown in FIG. 3. In explaining FIG. 4, it is assumed that the nonvolatile memory device 140 includes a flash memory device.

The memory region of the flash memory device 140 may be classified into pages and blocks according to the structural characteristics thereof. For instance, one memory block may include a plurality of pages. The flash memory device 140 performs a read or program operation by the unit of a page. The flash memory device 140 performs an erase operation by the unit of a block. Also, the flash memory device 140 may not perform overwriting. Namely, a memory cell of the flash memory device 140 should be erased to store new data. Due to such characteristics of the flash memory device 140, the controller 130 may drive an additional firmware, which is referred to as a flash translation layer (FTL).

The flash translation layer may manage the read, program, and erase operations of the nonvolatile memory device 140, so that the data storage device 120 may operate in response to an access requested from the file system of the host device 110. Further, the flash translation layer may manage subsidiary operations attributable to the characteristics of the nonvolatile memory device 140. The flash translation layer of a code type loaded on the working memory device 138 may be driven by the controller 130.

Referring to FIG. 4, the flash translation layer loaded on the working memory device 138 may include management data and a plurality of modules. For example, the flash translation layer may include an address mapping table 138A, a garbage collection module 138B, a wear-leveling module 138C, and a bad block management module 138D. Furthermore, the flash translation layer may further include an interleaving module for operating in parallel a plurality of nonvolatile memory devices, a sudden power-off management module for preparing against a sudden power-off, and so forth.

When the host device 110 accesses the data storage device 120, for example, requests a read or write operation, the host device 110 may provide a logical address to the data storage device 120. The flash translation layer may convert the provided logical address into a physical address of the flash memory device 140, and may perform a requested operation by referring to the converted physical address. The flash translation layer may manage address conversion data, that is, the address mapping table 138A, for such an address converting operation.

The garbage collection module 138B may manage memory blocks in which fragmented data are stored. The flash memory device 140 may not overwrite, and the unit of the program operation may be smaller than the unit of the erase operation. For this reason, the flash memory device 140 requires a job for collecting valid data dispersed at physically different positions, to the same address region by using an optional empty space when a storage space reaches a predetermined limit. The garbage collection module 138B may perform a job for collecting fragmented valid data to the same address region by performing a plurality of write operations and a plurality of erase operations.

The wear-leveling module 138C may manage the wear degrees of the memory blocks of the flash memory device 140. The memory cells of the flash memory device 140 are likely to age by repeated program and erase operations. Aged memory cells, that is, overused memory cells, may cause a fail, for example, a physical defect. The wear-leveling module 138C may manage the program-erase counts of respective memory blocks in such a way as to be substantially leveled to prevent a certain memory block of the flash memory device 140 from being overused earlier than the other memory blocks. For example, the wear-leveling module 138C may perform a job of copying the valid data of a memory block, which is relatively substantially overused, that is, a memory block with a large program-erase count number, to a memory block, which is relatively scarcely used, that is, a memory block with a small program-erase count number. The wear-leveling module 138C may manage a substantially overused memory block in such a way as not to be used for a preset time period.

The bad block management module 138D may manage a memory block in which a fail has occurred, among the memory blocks of the flash memory device 140. As aforementioned, a fail, for example, a physical defect, may occur in an overused memory cell. The data stored in the memory cell in which a fail has occurred may not be normally read. Furthermore, data may not be normally stored in a memory cell in which a fail has occurred. The bad block management module 138D may perform a job of copying the valid data of a memory block including a memory cell in which a fail has occurred, to a normal memory block. Moreover, the bad block management module 138D may manage the use of a memory block including a memory cell in which a fail has occurred, in such a way as to be blocked.

The garbage collecting operation performed through the garbage collection module 138B, the wear-leveling operation performed by the wear-leveling module 138C, and the bad block managing operation performed by the bad block management module 138D may be internal management jobs of the data storage device 120, attributable to the characteristics of the flash memory device 140. That is, the internal management jobs of the data storage device 120, attributable to the characteristics of the flash memory device 140, may not be included in jobs associated with input/output of data such as of outputting data to the host device 110 or being inputted with data from the host device 110. Accordingly, the internal management jobs of the data storage device 120, attributable to the characteristics of the flash memory device 140, may be included in host-independent jobs.

Figure 5:
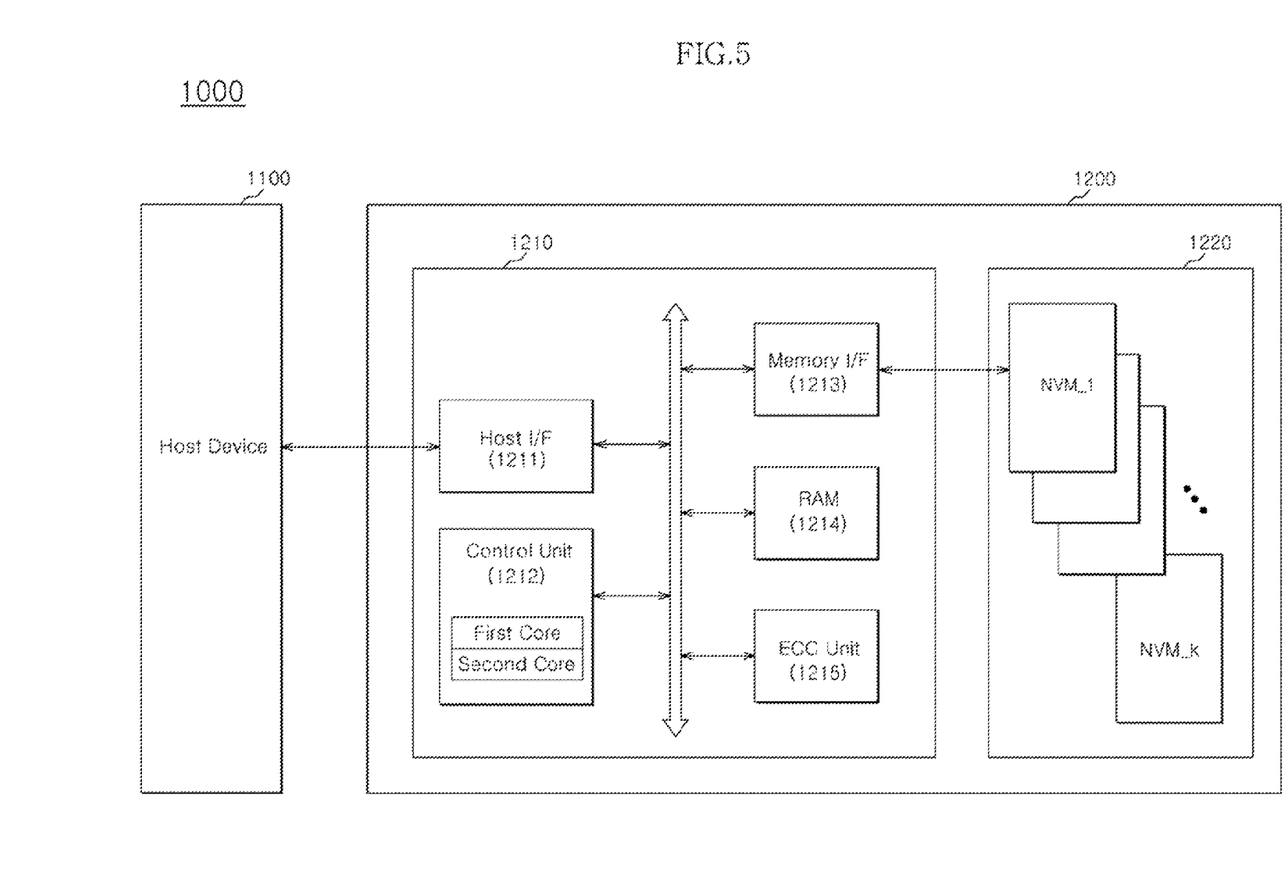
FIG. 5 is a block diagram illustrating a data processing system in accordance with an embodiment of the present invention.

FIG. 5 is a block diagram illustrating a data processing system 1000 in accordance with an embodiment of the present invention.

Referring to FIG. 5, the data processing system 1000 may include a host device 1100 and a data storage device 1200.

The data storage device 1200 may include a controller 1210 and a nonvolatile memory device 1220. The data storage device 1200 may be used by being electrically coupled to the host device 1100 such as a desktop computer, a notebook computer, a digital camera, a mobile phone, an MP3 player, a game player, and so forth. The data storage device 1200 is also referred to as a memory system.

The controller 1210 may access the nonvolatile memory device 1220 in response to a request from the host device 1100. For example, the controller 1210 may control the read, program or erase operation of the nonvolatile memory device 1220. The controller 1210 may drive a firmware for controlling the nonvolatile memory device 1220.

The controller 1210 may include component elements, which are well known in the art, such as a host interface 1211, a control unit 1212, a memory interface 1213, a RAM 1214, and an error correction code (ECC) unit 1215.

The control unit 1212 may include a first core with high performance and a second core with low performance. The first core may perform host-dependent jobs and host-independent jobs while the data storage device 1200 operates in a normal mode. The second core may perform host-independent jobs while the data storage device 1200 operates in a standby mode, an idle mode or a power-saving mode. Accordingly, since jobs may be performed through the second core with low performance while the data storage device 1200 operates in the standby mode, the power consumption of the data storage device 1200 may be reduced.

The control unit 1212 may control the general operations of the controller 1210 in response to a request from the host device 1100. The RAM 1214 may be used as the working memory of the control unit 1212. The RAM 1214 may temporarily store the data read from the nonvolatile memory device 1220 or the data provided from the host device 1100.

The host interface 1211 may interface the host device 1100 and the controller 1210. For example, the host interface 1211 may communicate with the host device 1100 through one of various interface protocols such as a universal flash storage (UFS) protocol, a universal serial bus (USB) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface 1213 may interface the controller 1210 and the nonvolatile memory device 1220. The memory interface 1213 may provide a command and an address to the nonvolatile memory device 1220. Furthermore, the memory interface 1213 may exchange data with the nonvolatile memory device 1220.

The error correction code unit 1215 may detect an error of the data read from the nonvolatile memory device 1220. Also, the error correction code unit 1215 may correct the detected error when the detected error falls within a correctable range. Meanwhile, the error correction code unit 1215 may be provided inside or outside the controller 1210 according to the memory system 1000.

The controller 1210 and the nonvolatile memory device 1220 may be integrated into one semiconductor apparatus and may be configured as a memory device. For example, the controller 1210 and the data storage media 1220 may be integrated into one semiconductor apparatus and may be configured as a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a personal computer memory card international association (PCMICA) card, a compact flash (CF) card, a smart media card, a memory stick, and so forth.

Figure 6:
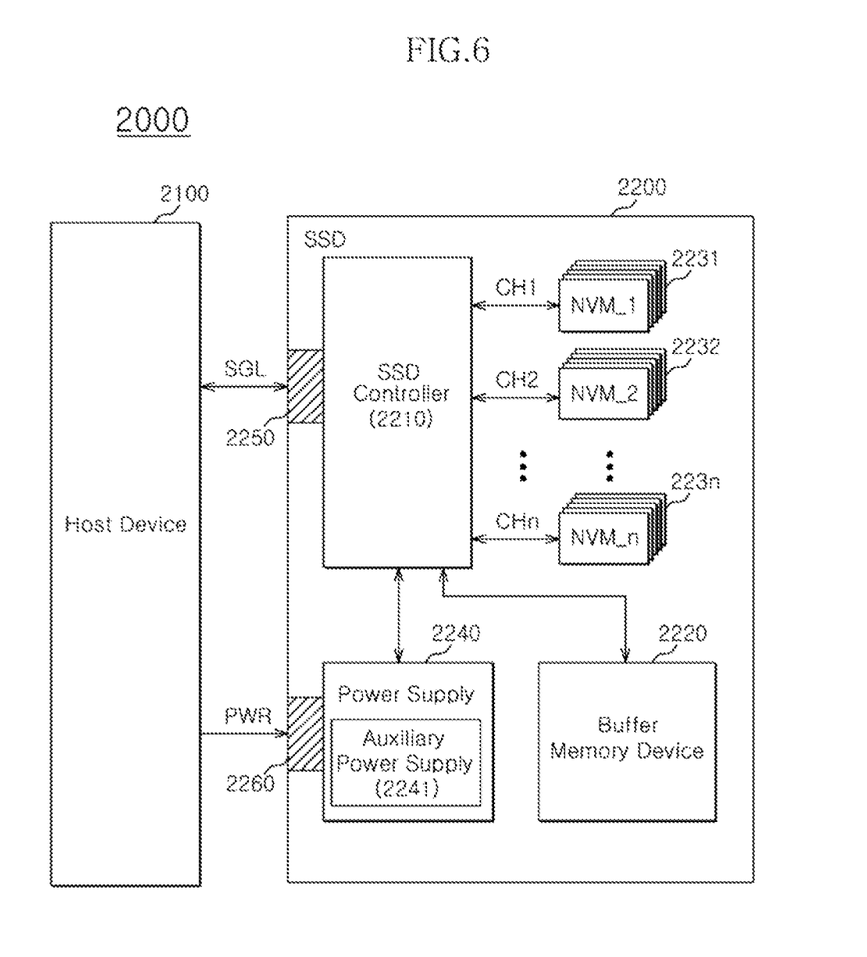
FIG. 6 is a block diagram illustrating a solid-state drive (SSD) in accordance with an embodiment of the present invention.

FIG. 6 is a block diagram illustrating a solid-state drive (SSD) in accordance with an embodiment of the present invention. Referring to FIG. 6, a data processing system 2000 may include a host device 2100 and an SSD 2200.

The SSD 2200 may include an SSD controller 2210, the buffer memory device 2220, nonvolatile memory devices 2231 to 223n, a power supply 2240, a signal connector 2250, and a power connector 2260.

The SSD 2200 may operate in response to a request from the host device 2100. That is, the SSD controller 2210 may access the nonvolatile memory devices 2231 to 223n in response to a request from the host device 2100. For example, the SSD controller 2210 may control the read, program and erase operations of the nonvolatile memory devices 2231 to 223n.

The buffer memory device 2220 may temporarily store data to be stored in the nonvolatile memory devices 2231 to 223n. Further, the buffer memory device 2220 may temporarily store data read from the nonvolatile memory devices 2231 to 223n. The data temporarily stored in the buffer memory device 2220 may be transmitted to the host device 2100 or the nonvolatile memory devices 2231 to 223n under the control of the SSD controller 2210.

The nonvolatile memory devices 2231 to 223n may be used as storage media of the SSD 2200. The nonvolatile memory devices 2231 to 223n may be electrically coupled to the SSD controller 2210 through a plurality of channels CH1 to CHn, respectively. One or more nonvolatile memory devices may be electrically coupled to one channel. The nonvolatile memory devices electrically coupled to one channel may be electrically coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power so as to allow the SSD 2200 to be normally terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may include a connector such as of a parallel advanced technology attachment (PATA), a serial advanced technology attachment (SATA), a small computer system interface (SCSI), a serial attached SCSI (SAS), peripheral component interconnection (PCI), and PCI express (PCI-E) protocols, depending on an interface scheme between the host device 2100 and the SSD 2200.

Figure 7:
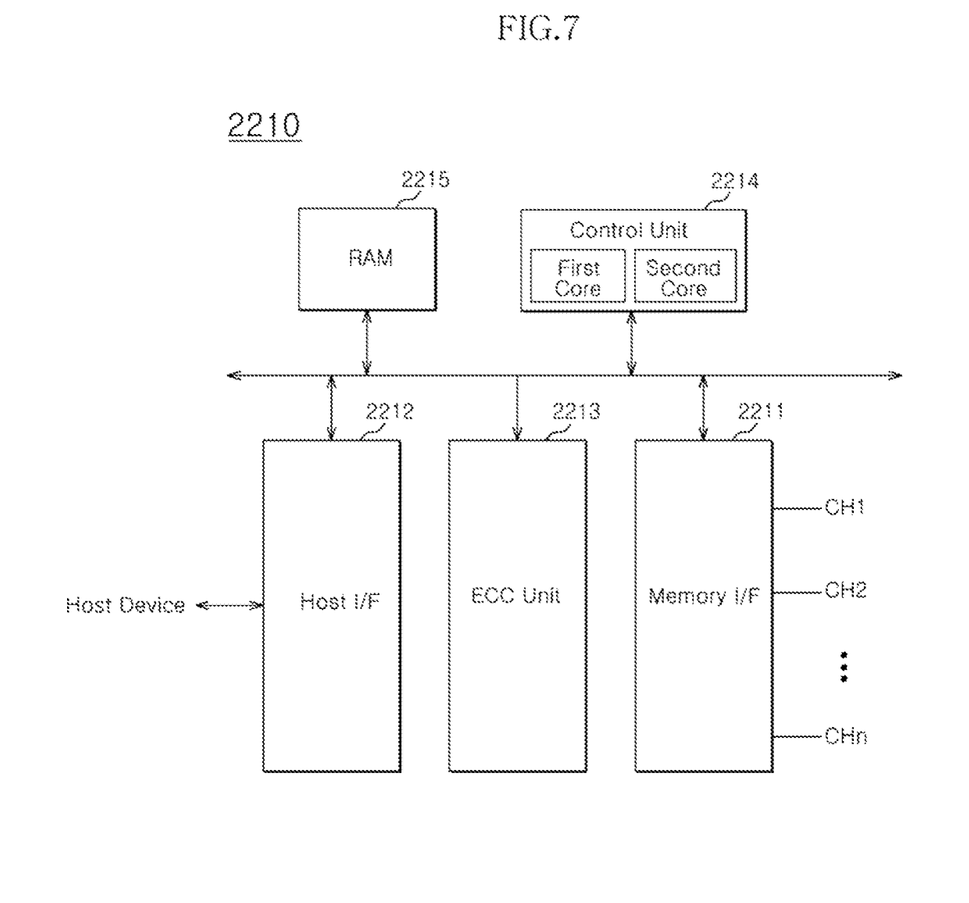
FIG. 7 is a detailed diagram of a SSD controller shown in FIG. 6.

FIG. 7 is a detailed block diagram of the SSD controller 2210 shown in FIG. 6.

Referring to FIG. 7, the SSD controller 2210 may include a memory interface 2211, a host interface 2212, an error correction code (ECC) unit 2213, a control unit 2214, and a RAM 2215.

The memory interface 2211 may provide a command and an address to the nonvolatile memory devices 2231 to 223n. Moreover, the memory interface 2211 may exchange data with the nonvolatile memory devices 2231 to 223n. The memory interface 2211 may scatter the data transmitted from the buffer memory device 2220 to the respective channels CH1 to CHn under the control of the control unit 2214. Furthermore, the memory interface 2211 may transfer the data read from the nonvolatile memory devices 2231 to 223n to the buffer memory device 2220, under the control of the control unit 2214.

The host interface 2212 may provide an interface with the SSD 2200 in correspondence to the protocol of the host device 2100. For example, the host interface 2212 may communicate with the host device 2100 through one of parallel advanced technology attachment (PATA), serial advanced technology attachment (SATA), small computer system interface (SCSI), serial attached SCSI (SAS), peripheral component interconnection (PCI), and PCI express (PCI-E) protocols. In addition, the host interface 2212 may perform a disk emulating function of supporting the host device 2100 to recognize the SSD 2200 as a hard disk drive (HDD).

The ECC unit 2213 may generate parity bits based on the data transmitted to the nonvolatile memory devices 2231 to 223n. The generated parity bits may be stored in spare areas of the nonvolatile memory devices 2231 to 223n. The ECC unit 2213 may detect an error of the data read from the nonvolatile memory devices 2231 to 223n. When the detected error falls within a correctable range, the ECC unit 2213 may correct the detected error.

The control unit 2214 may analyze and process a signal SGL inputted from the host device 2100. The control unit 2214 may control the general operations of the SSD controller 2210 in response to a request from the host device 2100. The control unit 2214 may control the operations of the buffer memory device 2220 and the nonvolatile memory devices 2231 to 223n according to a firmware for driving the SSD 2200. The RAM 2215 may be used as a working memory for driving the firmware.

The control unit 2214 may include a first core with high performance and a second core with low performance. The first core may perform host-dependent jobs and host-independent jobs while the SSD 2200 operates in a normal mode. The second core may perform host-independent jobs while the SSD 2200 operates in a standby mode, an idle mode or a power-saving mode. Accordingly, since jobs may be performed through the second core with low performance while the SSD 2200 operates in the standby mode, the power consumption of the SSD 2200 may be reduced.

Figure 8:
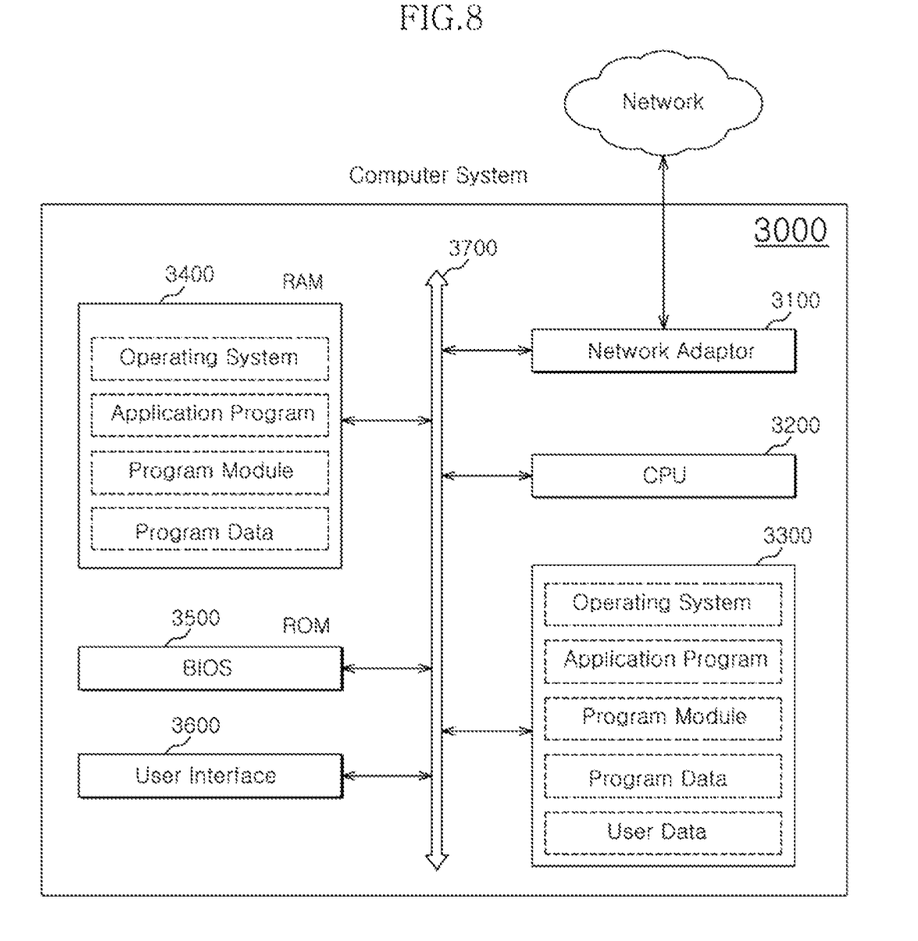
FIG. 8 is a block diagram illustrating a computer system in accordance with the embodiment of the present invention.

FIG. 8 is a block diagram illustrating a computer system 3000 in which the data storage device in accordance with the embodiment of the present invention is mounted.

Referring to FIG. 8, the computer system 3000 may include a network adaptor 3100, a central processing unit 3200, a data storage device 3300, a RAM 3400, a ROM 3500 and a user interface 3600, which are electrically coupled to a system bus 3700. The data storage device 3300 may include the data storage device 120 shown in FIG. 1, the data storage device 1200 shown in FIG. 5 or the SSD 2200 shown in FIG. 6.

The network adaptor 3100 provides interfacing between the computer system 3000 and external networks. The central processing unit 3200 performs general operations for driving an operating system residing at the RAM 3400 or an application program.

The data storage device 3300 stores general data used in the computer system 3000. For example, an operating system for driving the computer system 3000, an application program, various program modules, program data, and user data are stored in the data storage device 3300.

The RAM 3400 may be used as a working memory of the computer system 3000. Upon booting, the operating system, the application program, the various program modules and the program data used for driving programs, which are read from the data storage device 3300, are loaded on the RAM 3400. A basic input/output system (BIOS), which is activated before the operating system is driven, is stored in the ROM 3500. Information exchange between the computer system 3000 and a user is implemented through the user interface 3600.

Although not shown in FIG. 8, the computer system 3000 may further include devices such as an application chipset, a camera image processor, and so forth.

While certain embodiments have been described above, it will be understood to those skilled in the art that the embodiments described are by way of example only. Accordingly, the data storage device described herein should not be limited based on the described embodiments. Rather, the data storage device described herein should only be limited in light of the claims that follow.

What is claimed is:

1. A data storage device comprising:
a nonvolatile memory device; and
a controller suitable for controlling an operation of the nonvolatile memory device based on a request from a host device,
wherein the controller includes a first core activated in a normal mode and deactivated in a standby mode of the data storage device and a second core activated in the standby mode and deactivated in the normal mode of the data storage device, and
wherein the first core performs both a host-dependent job and a host-independent job and the second core performs only the host-independent job.

2. The data storage device according to claim 1, wherein the data storage device operates in the standby mode when there is no job requested from the host device.

3. The data storage device according to claim 1, wherein the first core performs a job for providing data read from the nonvolatile memory device to the host device, or a job for storing data provided from the host device in the nonvolatile memory device, as the host-dependent job.

4. The data storage device according to claim 1, wherein the second core performs a job for managing the nonvolatile memory device, as the host-independent job.

5. A data storage device comprising:
a nonvolatile memory device; and
a controller suitable for controlling the nonvolatile memory device based on a request from an external device,
wherein the controller comprises:
a control unit including a first core performing both a host-dependent job and a host-independent job, and a second core performing only the host-independent job; and
a power supply suitable for providing a first operation power to the first core in a normal mode and blocking providing of the first operation power to the first core in a standby mode of the data storage device, and providing a second operation power to the second core in the standby mode and blocking providing of the second operation power to the second core in the normal mode of the data storage device.

6. The data storage device according to claim 5, wherein the power supply provides a standby power used for the first core to retain the standby mode.

7. The data storage device according to claim 5, wherein the power supply provides a standby power used for the second core to retain the standby mode.

8. The data storage device according to claim 5, further comprising:
a clock generator suitable for providing a first operation clock to the first core in the normal mode, and providing a second operation clock to the second core in the standby mode.

9. The data storage device according to claim 8, wherein the clock generator blocks providing of the first operation clock to the first core in the standby mode or provides a standby clock used for the first core to retain the standby state.

10. The data storage device according to claim 8, wherein the clock generator blocks providing of the second operation clock to the second core in the normal mode or provides a standby clock used for the second core to retain the standby state.

11. The data storage device according to claim 8, wherein the first core provides an activated standby mode signal to the power supply and the clock generator when entering the standby mode from the normal mode.

12. The data storage device according to claim 11, wherein the second core provides an interrupt signal to the first core when entering the normal mode from the standby mode, and the first core provides a deactivated standby mode signal to the power supply and the clock generator in response to the interrupt signal.

13. The data storage device according to claim 12, wherein the power supply provides the second operation power to the second core in response to the activated standby mode signal, and provides the first operation power to the first core in response to the deactivated standby mode signal, and the clock generator provides the second operation clock to the second core in response to the activated standby mode signal, and provides the first operation clock to the first core in response to the deactivated standby mode signal.

14. The data storage device according to claim 5, wherein the external device includes a host device, and the data storage device operates in a standby mode when there is no job requested from the host device.

15. The data storage device according to claim 5, wherein the second core performs a job for managing the nonvolatile memory device, as the host-independent job.

16. The data storage device according to claim 5, wherein the first core performs a job for providing data read from the nonvolatile memory device to the host device, or performs a job for storing data provided from the host device in the nonvolatile memory device, as the host-dependent job.

* * * * *